(12) United States Patent
Noh et al.

(10) Patent No.: US 6,646,707 B2
(45) Date of Patent: Nov. 11, 2003

(54) FRINGE FIELD SWITCHING MODE LCD

(75) Inventors: Jeong Dong Noh, Busan (KR); Seung Hee Lee, Kyoungki-do (KR); Seok Lyul Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 94 days.

(21) Appl. No.: 09/974,536

(22) Filed: Oct. 10, 2001

(65) Prior Publication Data

US 2002/0041354 A1 Apr. 11, 2002

(30) Foreign Application Priority Data

Oct. 10, 2000 (KR) ........................................ 2000-59500

(51) Int. Cl.[7] ............................................. G02F 1/1343
(52) U.S. Cl. ....................................... 349/141; 349/143
(58) Field of Search ................................. 349/141, 143

(56) References Cited

U.S. PATENT DOCUMENTS

| | | | | |
|---|---|---|---|---|
| 6,285,431 B2 | * | 9/2001 | Lyu et al. .................... | 349/143 |
| 6,512,565 B1 | * | 1/2003 | Lee et al. .................... | 349/130 |
| 6,525,798 B1 | * | 2/2003 | Yamakita et al. ............ | 349/141 |
| 2001/0024246 A1 | * | 9/2001 | Song ........................... | 349/43 |
| 2002/0018166 A1 | * | 2/2002 | Matsumoto et al. ......... | 349/141 |
| 2002/0033922 A1 | * | 3/2002 | Hidehira et al. ............. | 349/141 |
| 2002/0163604 A1 | * | 11/2002 | Kim et al. .................... | 349/43 |

FOREIGN PATENT DOCUMENTS

KR 10 0209531 4/1999

* cited by examiner

Primary Examiner—Tarifur R. Chowdhury
(74) Attorney, Agent, or Firm—Ladas & Parry

(57) ABSTRACT

Disclosed is a fringe field switching mode LCD. The disclosed comprises a first and a second transparent insulating substrates arranged opposite to each other with a predetermined distance, with a liquid crystal layer including a plurality of liquid crystal molecules interposed between them; a plurality of gate bus lines and data bus lines formed on the first transparent insulating substrate and arranged in a matrix form to define a unit pixel; a thin film transistor formed at the intersection of the gate bus line and the data bus line; a counter electrode disposed in each unit pixel, made of transparent conductor; and a pixel electrode arranged in each unit pixel to generate a fringe field with the counter electrode, being insulated with the counter electrode and made of transparent conductor and including a plurality of upper slits and lower slits symmetrical each other with respect to long side of the pixel with a predetermined tilted angle.

13 Claims, 8 Drawing Sheets

FRINGE FIELD SWITCHING MODE LCD

BACKGROUND OF THE INVENTION

1. Field of the Invention

The present invention relates to a fringe field switching mode liquid crystal display, and more particularly, to a fringe field switching mode liquid crystal display capable of preventing degradation of screen quality due to color shift and disclination line.

2. Description of the Related Art

It is well known that a Fringe Field Switching mode Liquid Crystal Display (hereinafter referred to as FFS mode LCD) has been proposed in order to improve a low aperture ratio and transmittance of In Plane Switching mode LCD.

FIG. 1 is a plane view for showing a conventional FFS mode LCD. As shown in FIG. 1, a plurality of gate bus lines 3 and data bus lines 7 are arranged crossing with each other on a transparent insulating substrate such as glass substrate (not shown). A counter electrode 2 made of transparent conductor such as Indium Tin Oxide (ITO) is disposed in a pixel region defined by the lines 3, 7 crossing with each other. The counter electrode 2 generally has a plate shape and may have a comb shape.

A common electrode line 10 is disposed in order to continuously supply common signals to the counter electrode 2. The common electrode line 10 is parallel to the gate bus line 3, including a first part 10a being in contact with the upper part of the counter electrode 2 and a pair of second parts 10b extended from the first part 10a to be parallel to the data bus line 7 and to be in contact with one side and the other side of the counter electrode 2, respectively. The common electrode line 10 is generally formed at the same time when the gate bus line 3 is formed.

A pixel electrode 9 made of transparent conductor such as ITO, is arranged in the pixel region, overlapping with the counter electrode 2. The pixel electrode 9 and the counter electrode 2 are electrically insulated by a gate insulating layer (not shown). The pixel electrode 9 has a comb shape including a plurality of branches 9a arranged parallel to the data bus line 7 with the same distances and a bar 9b connecting one ends of each branch 9a.

A thin film transistor TFT is formed at the intersection of the gate bus line 3 and the data bus line 7. The thin film transistor TFT includes a part of the gate bus line 3 i.e. a gate electrode, a semiconductor layer (not shown) formed on the gate electrode with a gate insulating layer interposed, a source electrode 7a disposed over one side of the semiconductor layer and being in contact with the bar 9b of the pixel electrode 9, and a drain electrode 7b extended from the data bus line 7 and disposed over the other side of the semiconductor layer.

Although it is not shown in the above, a color filter substrate is arranged opposite to the above array substrate with a distance longer than that between the counter electrode 2 and the pixel electrode 9 and then, a liquid crystal layer comprising a plurality of liquid crystal molecules is interposed between the substrates.

According to the FFS mode LCD having the above structure, when a predetermined voltage is applied in the a counter electrode 2 and the pixel electrode 9, a fringe field is generated between the two electrodes and on the upper part thereof since the distance between the array substrate and the color filter substrate is longer than that between the electrodes 2,9. The fringe field has influence on all parts including the upper parts of the counter electrode 2 and of pixel electrode 9, thereby driving all liquid crystal molecules on the upper parts of the electrodes 2,9 as well as those between the electrodes 2,9.

Therefore, the FFS mode LCD has a high aperture ratio since the counter electrode and the pixel electrode are made of transparent conductor. Moreover, the FFS mode LCD has an improved transmittance since liquid crystal molecules over the upper part of the electrodes as well as those between the electrodes are driven.

However, in the FFS mode LCD, when a field is generated between the counter electrode and the pixel electrode, liquid crystal molecules having refractive anisotropy are arranged in one direction, thereby generating color shift according to a viewing angle and degrading screen quality.

Therefore, it is essential to prevent the color shift in order to improve screen quality of FFS mode LCD. As an effort to obtain improved screen quality, as shown in FIG. 2A, a pixel electrode 19 may have fracture slits S having a shape of "<" in a pixel. Alternatively, as shown in FIG. 2B, it has been proposed that the pixel electrode 19 has a structure that each pixel has a slit S in a slant direction symmetrical with the adjacent pixel. In the above structures, an electric field is generated in one pixel or in two symmetrical directions between adjacent pixels, thereby compensating refractive anisotropy of liquid crystal molecules and as a result, it is possible to prevent color shift.

However, according to the FFS mode LCD having compensating electrode structure to prevent color shift, when a positive liquid crystal is applied, a disclination line is generated from the end of pixel electrode. And, it is difficult to eliminate the disclination line, thereby degrading screen quality. In particular, the disclination line is generated more, when high voltage over driving voltage is applied on panel and external pressure is applied on a voltage-applied panel.

SUMMARY OF THE INVENTION

Therefore, an object of the present invention is to provide a FFS mode LCD preventing generation of color shift and disclination line or easily removing it when the disclination line is generated.

In order to accomplish the above object, FFS mode LCD of the present invention comprises: a first and a second transparent insulating substrates arranged opposite to each other with a predetermined distance, with a liquid crystal layer including a plurality of liquid crystal molecules interposed between them; a plurality of gate bus lines and data bus lines formed on the first transparent insulating substrate and arranged in a matrix form to define a unit pixel; a thin film transistor formed at the intersection of the gate bus line and the data bus line; a counter electrode disposed in each unit pixel, made of transparent conductor; and a pixel electrode arranged in each unit pixel to generate a fringe field with the counter electrode, being insulated with the counter electrode and made of transparent conductor and including a plurality of upper slits and lower slits symmetrical each other with respect to long side of the pixel with a predetermined tilted angle.

The pixel electrode may further have a reference slit arranged parallel to the gate bus line on the center of long side of pixel and dividing an upper slit and a lower silt. The upper slit and the lower slit have a tilted angle below +45° and below −45° respectively, and desirably, of ±2~20° with respect to the axis dividing them. The slit has a structure that adjacent pixels in the same column have the same tilted angle and adjacent pixels in the same line have opposite tilted angle.

And, the FFS mode LCD of the present invention include a first and a second alignment layers respectively arranged on the top of inner sides of the first and the second transparent insulating substrates and a first and a second polarizing plates respectively arranged on outer sides of the first and the second transparent insulating substrates. The first and the second alignment layers are rubbed parallel to the gate bus line when positive liquid crystals are applied, and rubbed parallel to the data bus line when negative liquid crystals are applied. The first and the second polarizing plates have transmission axes perpendicular to each other and one of the axes has the same direction as rubbing direction of the alignment layer.

Also, the FFS mode LCD of the present invention further include a common electrode line to apply common signals to the counter electrode. The common electrode line is arranged on the edge of pixel adjacent to the gate bus line, being parallel to the gate bus line or arranged on the center of each pixel, being parallel to the gate bus line.

The above objects, and other features and advantages of the present invention will become more apparent after reading the following detailed description when taken in conjunction with the drawings.

DETAILED DESCRIPTION OF THE INVENTION

Figure 1:
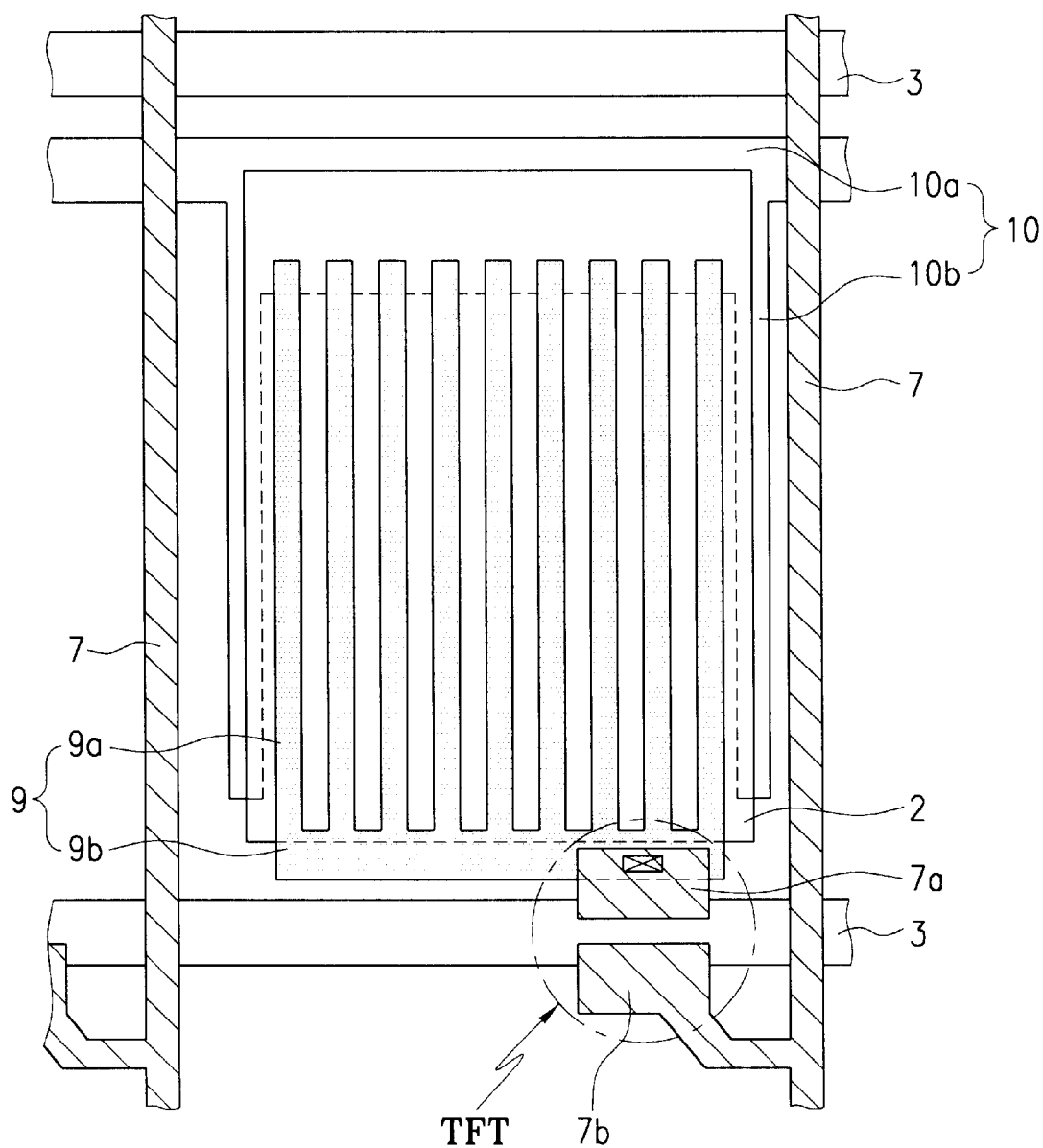
FIG. 1 is a plane view for showing a conventional fringe field switching mode LCD.
Figure 2A:
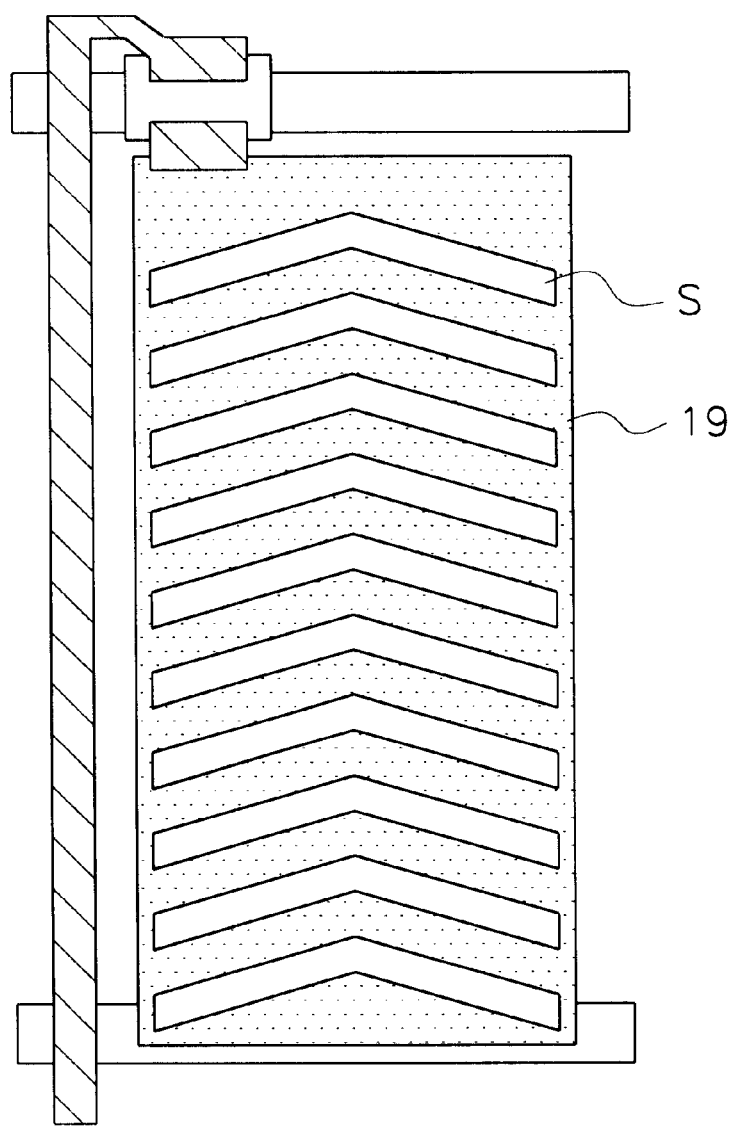
FIGS. 2A and 2B are plane views for showing a pixel electrode to eliminate color shift according to a conventional method.
Figure 2B:
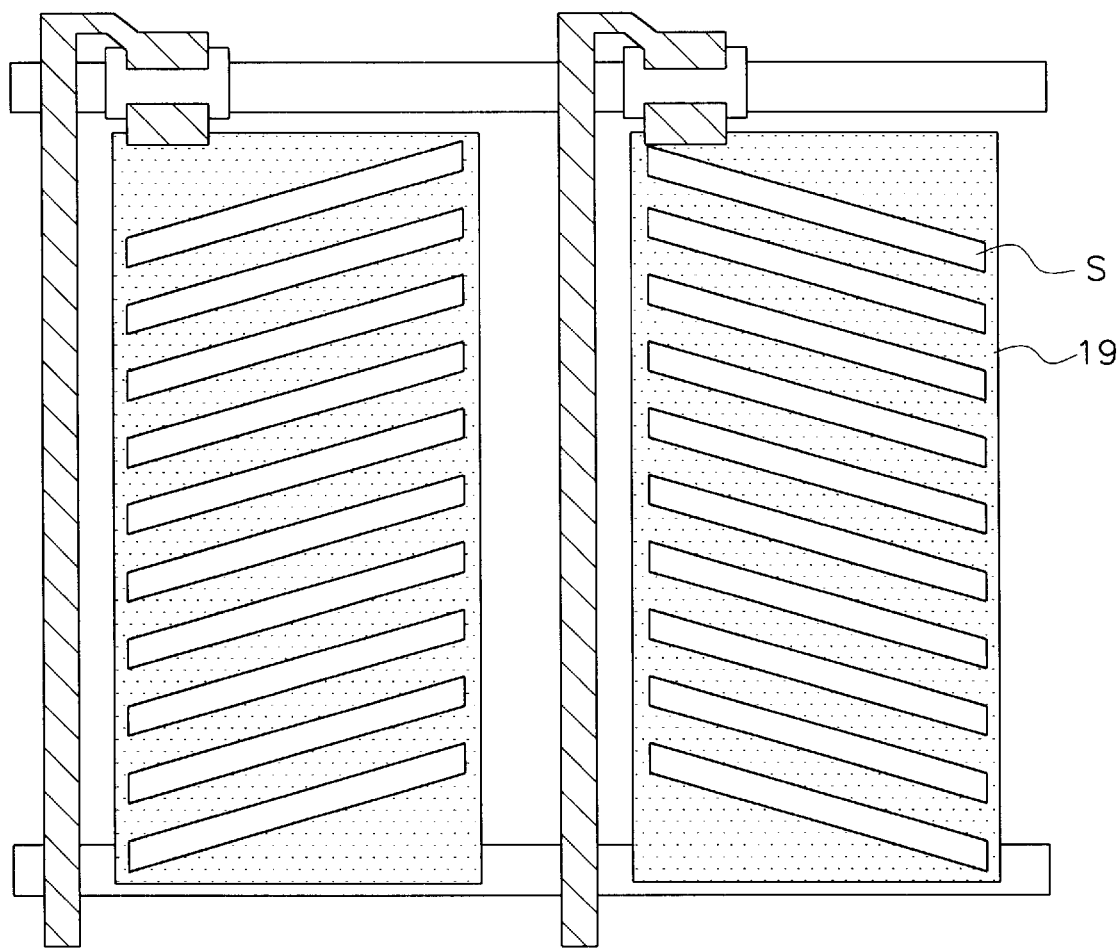
Figure 3A:
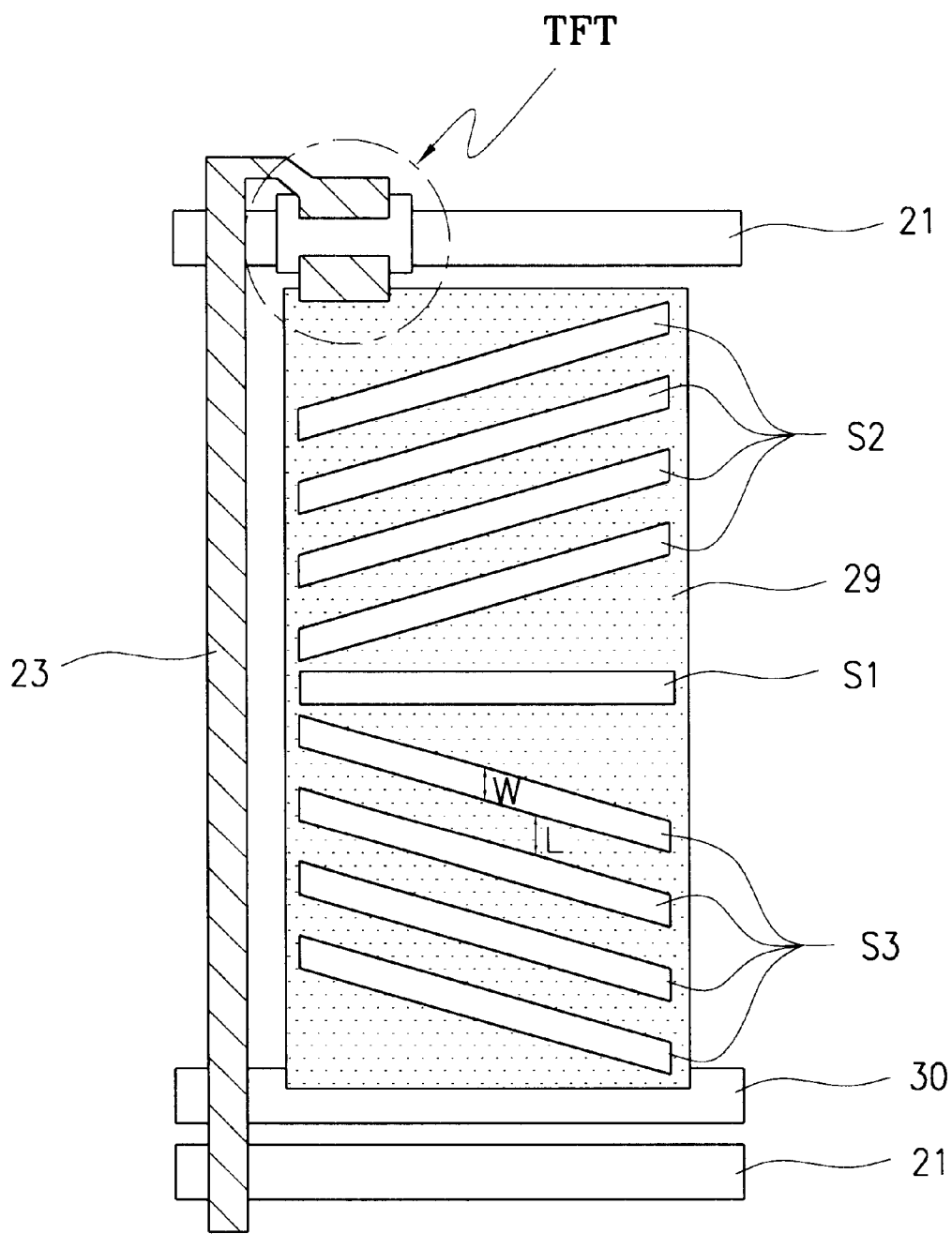
FIGS. 3A and 3B are plane views for showing a fringe field switching mode LCD according to an embodiment of the present invention.

Referring to FIG. 3A, a plurality of gate bus lines 21 and data bus lines 23 are cross arranged on a first transparent insulating substrate (not shown) to define a unit pixel. A thin film transistor TFT is formed as a switching device at the intersection of the gate bus line 21 and the data bus line 23. A counter electrode (not shown) is disposed in a plate form in the pixel. The counter electrode is made of transparent conductor, desirably, ITO.

A pixel electrode 29, made of transparent conductor such as ITO, is disposed in the pixel to be insulated with the counter electrode and to be in contact with the thin film transistor TFT. The pixel electrode 29 has a plurality of slits S1, S2, S3 therein. A reference slit S1 is arranged parallel to the gate bus line 21 on the center of long side of pixel and the upper slits S2 and the lower slits S3 are arranged with a predetermined tilted angle on the upper and the lower parts of the reference slit, respectively. The upper slit S2 and the lower slit S3 have a tilted angle below ±45°, desirably, ±2~20°, with respect to the reference slit S1. The slits S1, S2, S3 have a width W of 1~8 μm and the distance L between slits is 1~8 μm.

A common electrode line 30 is arranged parallel to the gate bus line 21 on the edge of pixel adjacent to the gate bus line 21 in order to apply common signals to the counter electrode. The common electrode line 30 is in contact with a part of the counter electrode, overlapped with a part of the pixel electrode 29.

Although it is not shown in the drawings, a color filter substrate having a structure that elements such as black matrix and color filter are formed on a second transparent insulating substrate, is arranged with a predetermined distance from the above array substrate. And a liquid crystal layer (not shown) including a plurality of positive or negative liquid crystal molecules is interposed between the substrates. Also, a first and a second alignment layers are formed on the inner sides of the array substrate and the color filter substrate and a first and a second polarizing plates are formed on the outer sides of the array substrate and the color filter substrate.

Herein, The first and the second alignment layers are rubbed parallel to the gate bus line 21 when positive liquid crystals are applied, and rubbed parallel to the data bus line 23 when negative liquid crystals are applied. The transmittance axes of the first and the second polarizing plates are formed perpendicular to each other to be operated in normally black mode, and one of the axes is parallel to rubbing direction of the alignment layer.

Figure 3B:
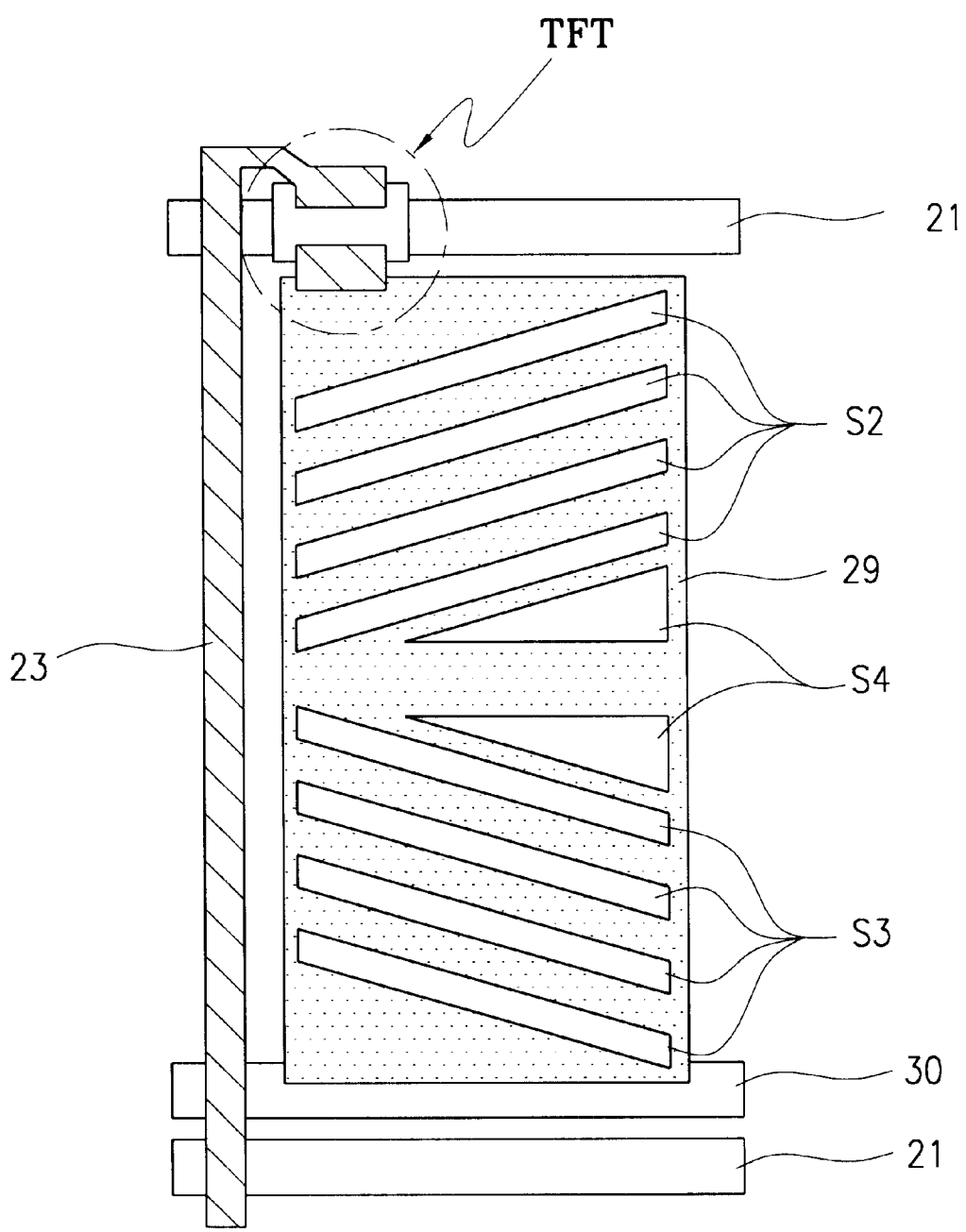

Referring to FIG. 3B, the pixel electrode 29 may have only upper slits S2 and lower slits S3, without a reference slit. In this case, a pair of dummy slits S4 having a triangular shape are additionally formed on adjacent regions of the upper slit S2 and the lower slit S4.

The operation of the above FFS mode LCD will be described in the following.

Figure 4A:
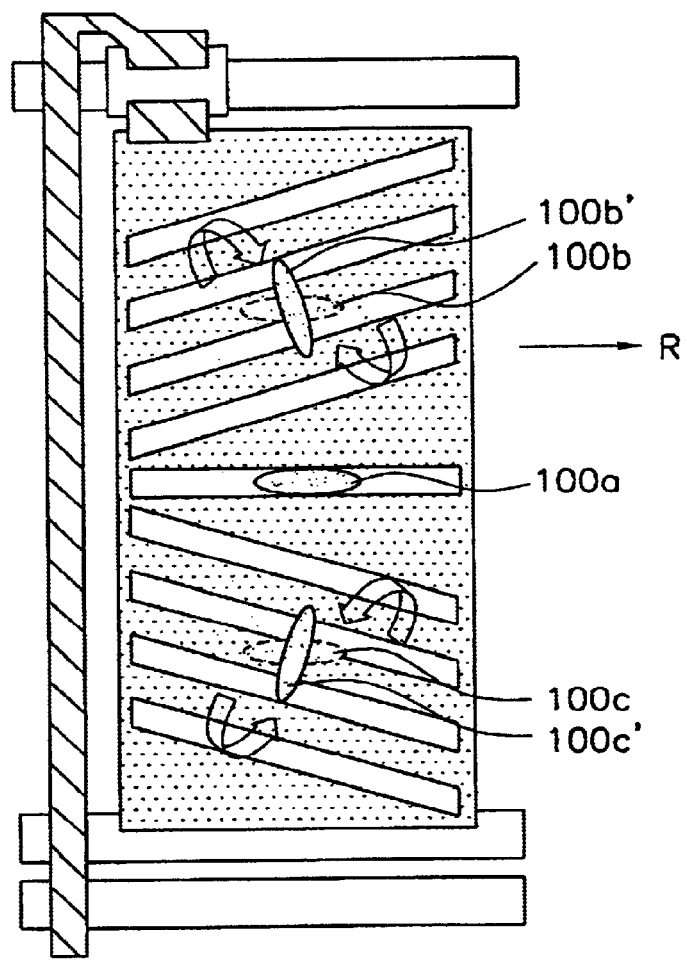
FIGS. 4A and 4B are plane views for showing driving of fringe field switching mode LCD according to an embodiment of the present invention.

Referring to FIG. 4A, when voltage is not applied, liquid crystal molecules 100a, 100b, 100c are arranged, the long side thereof being parallel to rubbing axis R.

When voltage is applied, a fringe field is generated due to voltage difference between counter electrode and pixel electrode, thereby rotating clockwise liquid crystal molecules 100b disposed on the upper part of the reference slit S1 and counterclockwise liquid crystal molecules 100c disposed on the lower part thereof. However, the reference slit S1 of pixel electrode has no change in the position. In the drawings, code 100b' indicates liquid crystal molecules rotated clockwise and 100c' liquid crystal molecules rotated counterclockwise.

When there is no reference slit, liquid crystal molecules are not rotated on the axis of symmetry of upper slits and lower slits, however, liquid crystal molecules 100b on the upper part thereof are rotated clockwise and liquid crystal molecules on the lower part thereof are rotated counterclockwise.

Figure 4B:
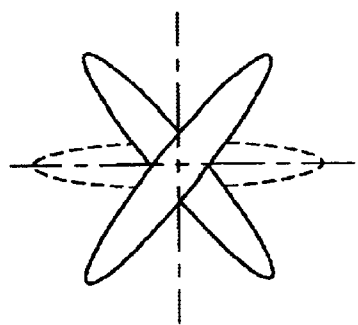

Therefore, as shown in FIG. 4B, liquid crystal molecules are arranged in two directions in one pixel, thereby compensating refractive anisotropy of liquid crystal molecules and preventing color shift. And, the pixel electrode has no fracture therein, thereby preventing generation of disclination line and if they are generated, it is easy to eliminate them.

As a result, FFS mode LCD of the present invention has improved screen quality by preventing color shift and by preventing or easily eliminating disclination lines.

While, various modifications of the embodiment are described in the following.

In the above embodiment, upper slits have a tilted angle of $+\theta$ and lower slits have a tilted angle of $-\theta$. However, the same effect is obtained in the contrary i.e. upper slits have a tilted angle of $-\theta$ and lower slits have a tilted angle of $+\theta$.

Figure 5:
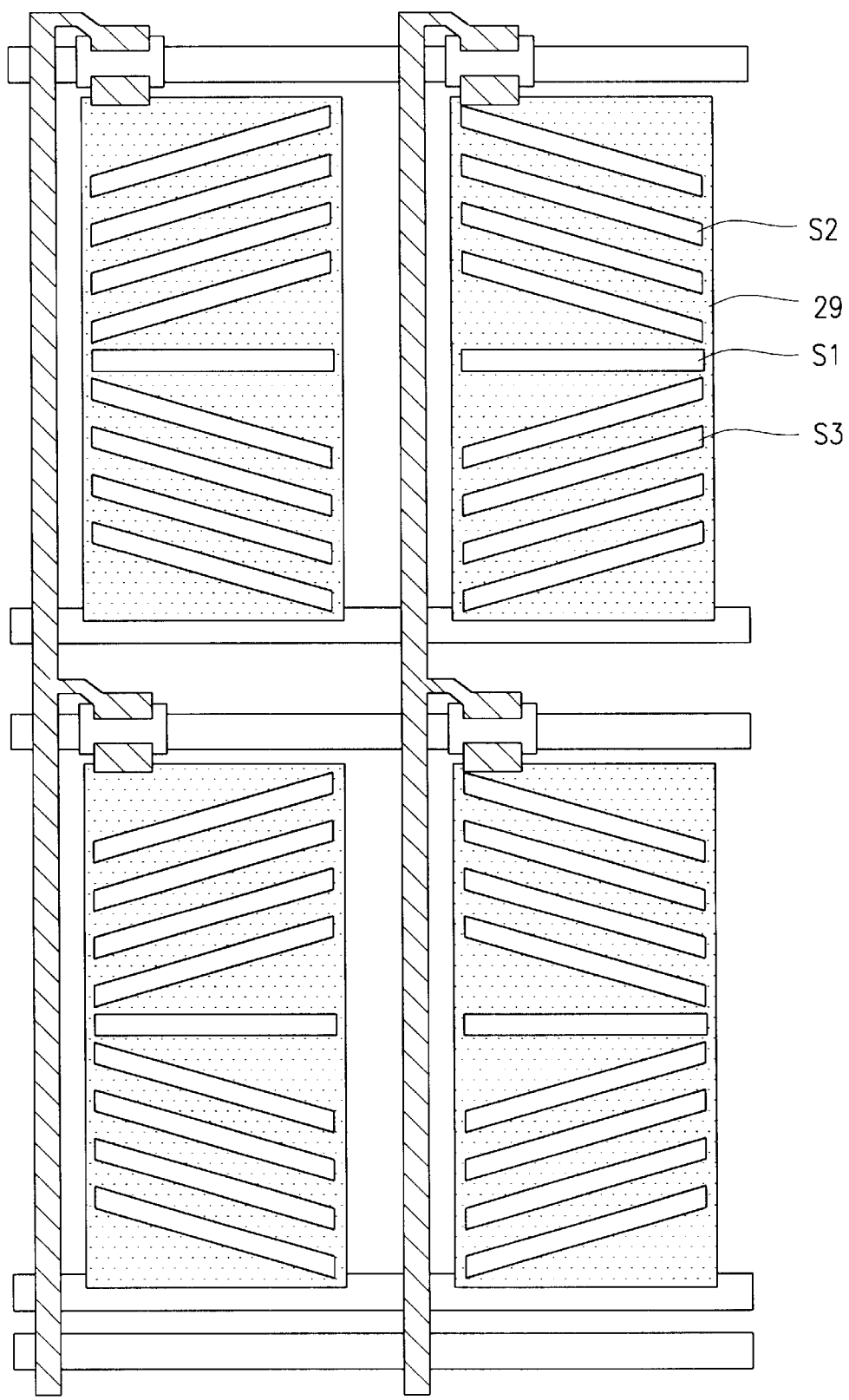
FIGS. 5 and 6 are plane views for showing a fringe field switching mode LCD according to another embodiment of the present invention.

And, referring to FIG. 5, in the pixel electrode 29, upper slits S2 and lower slits S3 have the structure that adjacent pixels have the same tilted angle in the same column and opposite tilted angle in the same line.

Figure 6:
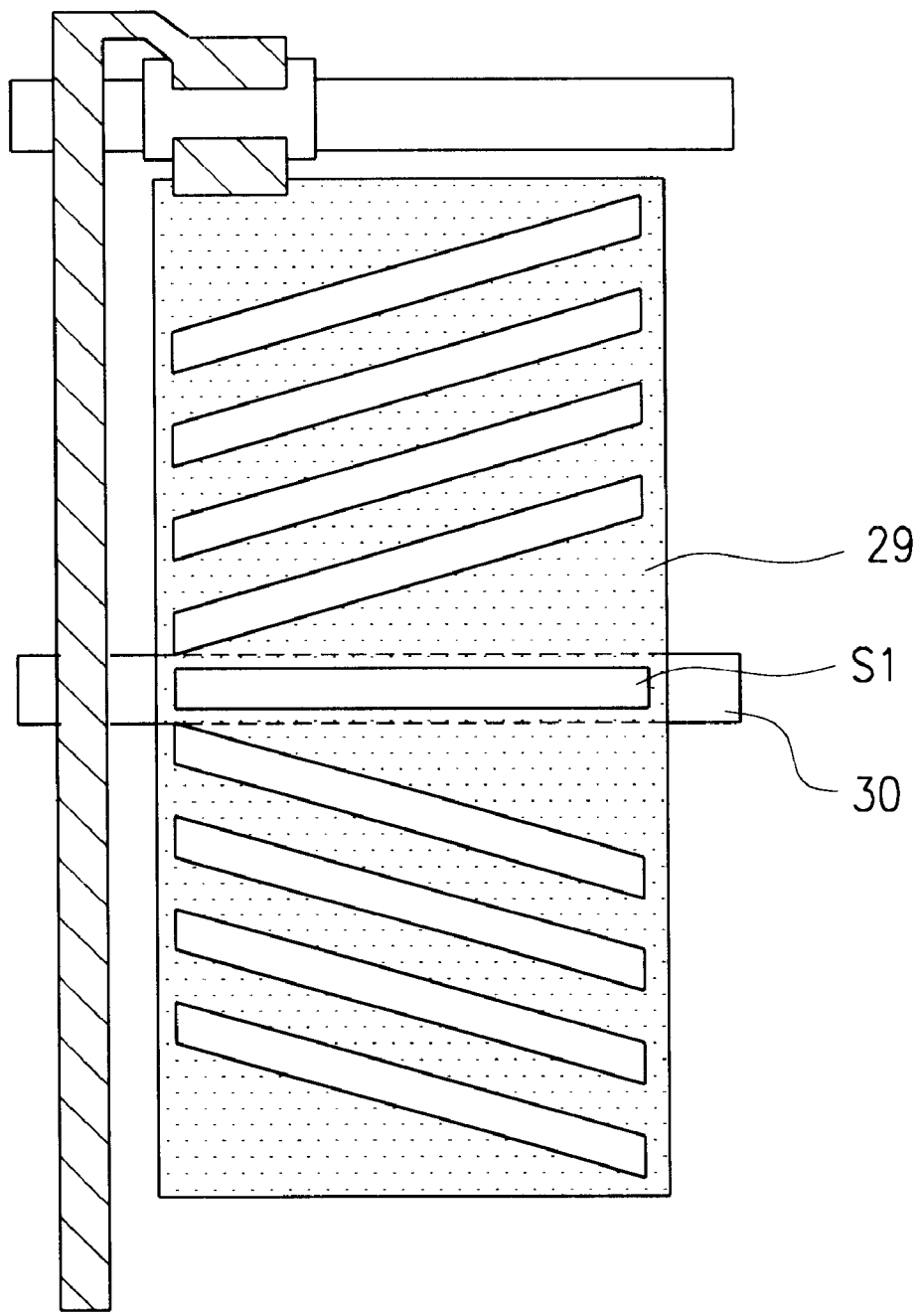

Further, referring to FIG. 6, the common electrode line 30 is arranged parallel to the gate bus line under the axis dividing the pixel into upper and lower parts by the direction of electric field, that is, a reference slit S1 of pixel electrode 29.

As described above, according to the present invention, a pixel electrode comprises a plurality of slits, wherein the silts have no fracture and the tilted angle thereof is symmetrical each other with respect to a reference slit, thereby preventing color shift and preventing or easily eliminating disclination line. As a result, the FFS mode LCD has improved screen quality.

Although the preferred embodiment of this invention has been disclosed for illustrative purpose, those skilled in the art will appreciate that various modifications, additions and substitutions are possible, without departing from the scope and spirit of the invention.

What is claimed is:

1. A fringe field switching mock LCD comprising:
    a first transparent insulating substrate;
    a second transparent insulating substrates arranged opposite to the first substrate at a distance;
    a liquid crystal layer having liquid crystal molecules interposed between the first and second substrates;
    a plurality of gate bus lines and a plurality of data bus lines formed on the first substrate, wherein an area formed by two gate bus lines intersecting two data bus lines substantially defines a unit pixel;
    a thin film transistor formed at a selected intersection of the gate bus line and the data bus line;
    a counter electrode made from a transparent conductor material disposed in each unit pixel; and
    a pixel electrode also made from a transparent conductor material arranged in each unit pixel and insulated from the counter electrode of the same unit pixel to generate a fringe field in the liquid crystal layer in cooperation with the counter electrode,
        wherein the pixel electrode has a plurality of upper slits parallelly arranged at a first tilt angle in a portion of the unit pixel and a plurality of lower slits parallelly arranged at a second tilt angle in another portion of the unit pixel,
        wherein the upper slits and the lower slits are arranged in the unit pixel as minor images of each other such that the first and second tilt angles are measured with respect to the axis that divides the upper and lower slits into mirror images, and
        further wherein no upper slit is connected to any of the lower slits.

2. The fringe field switching mode LCD according to claim 1, wherein the pixel electrode further comprises a reference slit dividing the upper slit and the lower slit and arranged parallel to the gate bus line.

3. The fringe field switching mode LCD according to claim 1, wherein the first tilted angle of the upper slits and the second tilt angle of the lower slits are between +45 degree and −45 degree.

4. The fringe field switching mode LCD according to claim 3, wherein the first tilted angle of the upper slits and the second tilt angle of the lower slits are between −2 degree and about +20 degree.

5. The fringe field switching mode LCD according to claim 1, wherein the width of each of the upper or lower slit is between −1 μm and about +8 μm and the distance between two adjacent slits is between −1 μm and about +8 μm.

6. The fringe field switching mode LCD according to claim 1, wherein the slits of the pixel electrode in one unit pixel and the slits of the pixel electrode in an adjacent unit pixel are arranged as mirror images of each other.

7. The fringe field switching mode LCD according to claim 1, further comprising
    a first alignment layer arranged between the first substrate and the liquid crystal layer;
    a second alignment layers arranged between the liquid crystal layer and the second substrate;
    a first polarizing plate arranged on the outer side of the first substrate; and
    a second polarizing plates arranged on outer side of the second substrates.

8. The fringe field switching mode LCD according to claim 7, wherein the first and the second alignment layers are rubbed parallel to the gate bus line when liquid crystals are anisotropically positive or parallel to the data bus line when the liquid crystals are anisotropically negative.

9. The fringe field switching mode LCD according to claim 7, wherein the first polarizing plate has a first transmission axis and the second polarizing plate has a second transmission axis, wherein the first and second transmission axes are perpendicular to each other and one of the axes is in the same direction as the rubbing direction of the alignment layer.

10. The fringe field switching mode LCD according to claim 1, further comprising a common electrode line for providing common signals to the counter electrode.

11. The fringe field switching mode LCD according to claim 10, wherein the common electrode line is arranged on the edge of the unit pixel adjacent the gate bus line, parallel to the gate bus line.

12. The fringe field switching mode LCD according to claim 10, wherein the common electrode line is arranged on a line along the center of the unit pixel, parallel to the gate bus line.

13. A fringe filed switching mode LCD comprising:
    a first transparent insulating substrate; and
    a second transparent insulating substrates arranged opposite to the first substrate at a distance;
    a liquid crystal layer having liquid crystal molecules interposed between the first and second substrates;
    a plurality of gate bus lines and a plurality of data bus lines formed on the first substrate, wherein an area formed by two gate bus lines intersecting two data bus lines substantially defines a unit pixel;
    a thin film transistor formed at a selected intersection of the gate bus line and the data bus line;
    a counter electrode made from a transparent conductor material disposed in each unit pixel;
    a pixel electrode also made from a transparent conductor material arranged in each unit pixel and insulated from the counter electrode to generate a fringe field in the liquid crystal layer,
        wherein the pixel electrode has a plurality of upper slits parallely arranged at a first tilt angle in a portion of the unit pixel and a plurality of lower slits parallely arranged at a second tilt angle in another portion of the unit pixel.
        wherein the upper slits and the lower slits are arranged in the unit pixel as mirror images of each other such that the tilt angle is measured with respect to the axis that divides the upper and lower slits into mirror images, and further wherein no upper slit is connected to any of the lower slit;

a first alignment layer arranged between the first substrate and the liquid crystal layer;

a second alignment layers arranged between the liquid crystal layer and the second substrates;

a first polarizing plate arranged on the outer side of the first substrate; and a second polarizing plates arranged on the outer sides of the second substrates.

\* \* \* \* \*